(12) United States Patent
Bobick et al.

(10) Patent No.: US 8,898,134 B2
(45) Date of Patent: *Nov. 25, 2014

(54) METHOD FOR RANKING RESOURCES USING NODE POOL

(75) Inventors: Mark Bobick, Indialantic, FL (US); Carl Wimmer, Christ Church (BB)

(73) Assignee: Make Sence, Inc., Tortola (VG)

(*) Notice: Subject to any disclaimer, the term of this patent is extended or adjusted under 35 U.S.C. 154(b) by 0 days.

This patent is subject to a terminal disclaimer.

(21) Appl. No.: 13/400,829

(22) Filed: Feb. 21, 2012

(65) Prior Publication Data

US 2012/0150835 A1    Jun. 14, 2012

Related U.S. Application Data

(63) Continuation of application No. 11/426,932, filed on Jun. 27, 2006, now Pat. No. 8,140,559, which is a continuation-in-part of application No. 11/273,568, filed on Nov. 14, 2005, now Pat. No. 8,108,389, and a continuation-in-part of application No. 11/314,835, filed on Dec. 21, 2005, now Pat. No. 8,126,890.

(60) Provisional application No. 60/694,331, filed on Jun. 27, 2005.

(51) Int. Cl.
*G06F 17/30* (2006.01)
*G06N 5/02* (2006.01)
*G06F 17/27* (2006.01)

(52) U.S. Cl.
CPC .... *G06F 17/30864* (2013.01); *G06F 17/30675* (2013.01); *G06N 5/022* (2013.01); *G06F 17/2795* (2013.01); *G06F 17/3066* (2013.01)
USPC .......................................................... 707/706

(58) Field of Classification Search
USPC .......................................................... 707/761
See application file for complete search history.

(56) References Cited

U.S. PATENT DOCUMENTS 4,716,572 A    12/1987   Kuhn et al. ................. 373/88
5,371,673 A    12/1994   Fan ................................. 704/1
(Continued)

FOREIGN PATENT DOCUMENTS

EP    1225517     7/2002    ............. G06F 17/30
JP    4/252375    9/1992    ............. G06F 15/40
(Continued)

OTHER PUBLICATIONS

U.S. Appl. No. 13/363,923, filed Feb. 2012, Bobick et al.

(Continued)

*Primary Examiner* — Mariela Reyes
*Assistant Examiner* — Mohammad Rahman
(74) *Attorney, Agent, or Firm* — Allen, Dyer, Doppelt, Milbrath & Gilchrist, P.A.

(57) ABSTRACT

An improved search engine creates correlations linking terms from inputs provided by a user to selected target terms. The correlation search process receives pre-processed inputs from a user including a wide variety of input formats including keywords, phrases, sentences, concepts, compound queries, complex queries and orthogonal queries. The pre-processing also includes pre-processing of general digital information objects and static or dynamic generation of questions. After a correlation search of the information presented by the pre-processing, the search results are processed in novel ways to provide an improved relevance ranking of results.

20 Claims, 12 Drawing Sheets

(56) References Cited

U.S. PATENT DOCUMENTS

| | | | |
|---|---|---|---|
| 5,432,118 A | 7/1995 | Orlowski et al. | 438/444 |
| 5,632,480 A | 5/1997 | Davis et al. | 473/483 |
| 5,684,985 A | 11/1997 | Ahmadi | 707/100 |
| 5,761,418 A | 6/1998 | Francis et al. | 709/201 |
| 5,761,631 A | 6/1998 | Nasukawa | 704/9 |
| 5,963,940 A | 10/1999 | Liddy et al. | 707/5 |
| 5,985,736 A | 11/1999 | Orlowski et al. | 438/445 |
| 6,092,077 A | 7/2000 | Ahmadi | 707/102 |
| 6,275,817 B1 | 8/2001 | Reed et al. | 706/45 |
| 6,466,971 B1 | 10/2002 | Humpleman et al. | 709/220 |
| 6,470,351 B1 | 10/2002 | Ahmadi | 707/102 |
| 6,529,934 B1 | 3/2003 | Kawamura et al. | 718/102 |
| 6,615,253 B1 | 9/2003 | Bowman-Amuah | 709/219 |
| 6,628,314 B1 | 9/2003 | Hoyle | 345/854 |
| 6,633,742 B1 | 10/2003 | Turner et al. | 434/350 |
| 6,636,865 B2 | 10/2003 | Ahmadi | 707/102 |
| 6,654,740 B2 | 11/2003 | Tokuda et al. | 707/500 |
| 6,766,320 B1 | 7/2004 | Wang et al. | 707/5 |
| 6,836,768 B1 | 12/2004 | Hirsch | 707/3 |
| 6,862,710 B1* | 3/2005 | Marchisio | 715/206 |
| 6,879,951 B1 | 4/2005 | Kuo | 704/10 |
| 6,941,513 B2 | 9/2005 | Meystel et al. | 715/256 |
| 6,986,104 B2 | 1/2006 | Green et al. | 715/234 |
| 7,165,071 B2 | 1/2007 | Fanning et al. | 707/10 |
| 7,249,117 B2 | 7/2007 | Estes | 706/52 |
| 7,269,789 B2 | 9/2007 | Mitsugi | 715/256 |
| 7,447,683 B2 | 11/2008 | Quiroga et al. | 1/1 |
| 7,684,975 B2 | 3/2010 | Aoki et al. | 704/10 |
| 8,024,653 B2 | 9/2011 | Bobick et al. | 715/255 |
| 8,024,802 B1* | 9/2011 | Preston | 726/22 |
| 8,108,389 B2 | 1/2012 | Bobick et al. | 707/736 |
| 2001/0047355 A1* | 11/2001 | Anwar | 707/5 |
| 2001/0056445 A1 | 12/2001 | Meystel et al. | 707/513 |
| 2002/0002450 A1 | 1/2002 | Nunberg et al. | 704/1 |
| 2002/0032740 A1 | 3/2002 | Stern et al. | 707/206 |
| 2002/0040359 A1 | 4/2002 | Green et al. | 707/3 |
| 2002/0052740 A1 | 5/2002 | Charlesworth et al. | 704/220 |
| 2002/0059069 A1* | 5/2002 | Hsu et al. | 704/257 |
| 2002/0059220 A1 | 5/2002 | Little | 707/5 |
| 2002/0083170 A1 | 6/2002 | Collazo | 709/224 |
| 2002/0152202 A1 | 10/2002 | Perro et al. | 707/3 |
| 2003/0028564 A1 | 2/2003 | Sanfilippo | 707/513 |
| 2003/0050932 A1 | 3/2003 | Pace et al. | 707/100 |
| 2003/0126235 A1 | 7/2003 | Chandrasekar et al. | 709/220 |
| 2003/0163302 A1 | 8/2003 | Yin | 704/9 |
| 2004/0030741 A1 | 2/2004 | Wolton et al. | 709/202 |
| 2004/0117341 A1 | 6/2004 | Varajarajan | 707/1 |
| 2004/0123233 A1 | 6/2004 | Cleary et al. | 715/513 |
| 2004/0163043 A1 | 8/2004 | Baudin et al. | 715/513 |
| 2004/0169683 A1 | 9/2004 | Chiu et al. | 345/776 |
| 2004/0172389 A1 | 9/2004 | Galai et al. | 707/3 |
| 2004/0183837 A1 | 9/2004 | Watanabe et al. | 345/853 |
| 2004/0193520 A1 | 9/2004 | LaComb et al. | 705/35 |
| 2004/0205670 A1 | 10/2004 | Mitsugi | 715/531 |
| 2004/0254904 A1 | 12/2004 | Nelken et al. | 706/50 |
| 2005/0086212 A1 | 4/2005 | Hughes et al. | 707/3 |
| 2005/0108001 A1 | 5/2005 | Aarskog | 704/10 |
| 2005/0132070 A1 | 6/2005 | Redlich et al. | 709/228 |
| 2005/0154690 A1 | 7/2005 | Nitta et al. | 706/46 |
| 2005/0187866 A1 | 8/2005 | Lee | 705/39 |
| 2005/0193029 A1 | 9/2005 | Rom et al. | 707/200 |
| 2005/0234894 A1 | 10/2005 | Tenazas | 707/3 |
| 2005/0246358 A1 | 11/2005 | Gross | 707/100 |
| 2005/0267871 A1 | 12/2005 | Marchisio et al. | 707/3 |
| 2005/0283369 A1 | 12/2005 | Clausner et al. | 704/275 |
| 2005/0288920 A1 | 12/2005 | Green et al. | 704/3 |
| 2005/0289168 A1 | 12/2005 | Green et al. | 707/101 |
| 2006/0062470 A1 | 3/2006 | Zhu | 382/186 |
| 2006/0080338 A1 | 4/2006 | Seubert et al. | 707/100 |
| 2006/0136295 A1 | 6/2006 | Bobick et al. | 705/14 |
| 2006/0167931 A1 | 7/2006 | Bobick et al. | 707/102 |
| 2006/0242130 A1 | 10/2006 | Sadri et al. | 707/3 |
| 2007/0174149 A1 | 7/2007 | Dinger et al. | 705/28 |
| 2007/0192319 A1 | 8/2007 | Finley et al. | 707/7 |
| 2008/0005651 A1 | 1/2008 | Grefenstette et al. | 715/500 |
| 2010/0049682 A1* | 2/2010 | Chow et al. | 706/46 |
| 2010/0166165 A1* | 7/2010 | Langseth et al. | 379/201.01 |
| 2012/0004905 A1 | 1/2012 | Bobick et al. | 715/255 |

FOREIGN PATENT DOCUMENTS

| | | | |
|---|---|---|---|
| JP | 10/124522 | 5/1998 | G06F 17/30 |
| JP | 2000/112938 | 4/2000 | G06F 17/27 |
| JP | 2003/228580 | 8/2003 | G06F 17/30 |
| JP | 2004/021763 | 1/2004 | G06F 17/30 |
| JP | 2005/258659 | 9/2005 | G06F 17/30 |
| WO | 01/67280 | 9/2001 | G06F 17/00 |
| WO | 03/056467 | 7/2003 | G06F 17/30 |
| WO | 2006/053306 | 5/2006 | G06F 17/00 |

OTHER PUBLICATIONS

U.S. Appl. No. 13/325,368, filed Dec. 2011, Bobick et al.

U.S. Appl. No. 11/427,600, filed Jun. 2006, Bobick et al.

Andres et al. "Dynamic Topic Mapping Using Latent Semantic Indexing". Proceedings of the Third International Conference on Information Technology and Applications. ICITA 2005. IEEE, vol. 2, Jul. 4, 2005, pp. 220-225.

Almpanidis et al. "Focused Crawling Using Latent Semantic Indexing-An Application for Vertical Search Engines". Research and Advanced Technology for Digital Libraries Lecture Notes in Computer Science; LNCS, Springer, Berlin, DE, vol. 3652, Jan. 1, 2005, pp. 402-413.

Benjamin C. Hachey, "Recognising Clauses Using Symbolic and Machine Learning Approaches", University of Edinburgh, Sep. 2002, 94 pages.

Kelledy et al., "Automatic Phrase Recognition and Extraction from Text", Proceedings of the 19th Annual BCS-IRSG Colloquium on IR Research, 1997, 9 pages.

Chen, K., Topic Identification in Discourse, Morgan Kaufman, 1995, pp. 1-5.

"WebSphere Business Integration Adapter Framework". Found at http://www-01.ibm.com/software/integration/wbiadapters/framework, 2009, 1 page.

Joshua Bloch, "Trial:Collections". The Java™ Tutorial. Found at http://java.sun.com/docs/books/tutorial/collections. Copyright 1995-2005 Sun Microsystems, Inc., pp. 1-17.

"Python for NLP and the Natural Language Toolkit" CS1576: AI Application Development, (modified from Edward Loper's notes), Spring 2003. Found at http://www.cs.pitt.edu/~litman/courses/cs1573s03/lec/nltk.ppt, pp. 1-47.

Editor Dave Beckett. "RDF/XML Syntax Specification (Revised)", W3C Recommendation Feb. 10, 2004. Found at http://www.w3.org/TR/2004/REC-rdf-syntax-grammar-20040210/. Copyright 2004 W3C® (MIT,ERCIM,Keio), 1 page.

Lattner et al. "Automatic Pool Allocation for Disjoint Data Structures". ACM SIGPLAN Workshop on Memory System Performance (MSP2002), Jun. 16, 2002. Found at http://llvm.cs.uiuc.edu/pubs/2002-06-AutomaticPoolAllocation.ppt, pp. 1-21.

"Relational Database System Concepts" Penn Computing, Information Systems and Computing, University of Pennsylvania. Found at http://www.upenn.edu/computing/da/dw/concepts.html. Dec. 2001, pp. 1-3.

Ramakrishnan, "An Introduction to Java Map Collection Classes". Found at http://www.theserverside.com/news/thread.tss?thread_id=28777, Sep. 2004, pp. 1-6.

G. Veda, "Personal Information Systems", Dept. of Computer Science & Engineering, Indian Institute of Technology, Kanpur, UP, India—208016. Found at http://www.cse.iitk.ac.in/report-repository/2005/btp.pdf. May 2, 2005, pp. 1-12.

Eric W. Weisstein. "Acyclic Digraph", from MathWorld—A Wolfram Web Resource. © 1999-2005 Wolfram Research, Inc. Found at http://mathworld.wolfram.com/AcyclicDigraph.html, pp. 1-2.

"Directed Acyclic Graph", from Wikipedia. Found at http://en.wikipedia.org/wiki/Directed_acyclic_graph. Jun. 19, 2005, pp. 1-2.

"ICS 161: Design and Analysis of Algorithms—Lecture notes for Feb. 8, 1996". ICS 161—Dept. Information & Computer Science, UC Irvine. Found at http://www.ics.uci.edu/~eppstein/161/960208.html. May 2, 2000, pp. 1-4.

(56) References Cited

OTHER PUBLICATIONS

"Link Analysis: Why is it fundamental to search engine optimization?" Found at http://www.oyster-web.co.uk/link-analysis/link-analisys.html. © 2005 Indicium Web Design UK, pp. 1-4.

Ziv Bar-Yossef. "Algorithms for Large Data Sets". Lecture 3. Found at http://www.ee.technion.ac.il/courses/049011. Mar. 23, 2005, pp. 1-29.

"SVM Application List". Found at http://www.kernel-machines.org/links/isabelle-guyons-svm-application-list/. Jun. 20, 2005, pp. 1-21.

"Glossary of Graph Theory". Found at http://encyclopedia.laborlawtalk.com/Glossary_of_graph_theory, 2006, pp. 1-9.

"jmbox Project Home". Found at https://mbox.dev.java.net/. © 2007 CollabNet, 1 page.

Eric W. Weisstein. "Web Graph", from MathWorld—A Wolfram Web Resource. Found at http://mathworld.wolfram.com/WebGraph.html. © 1999 CRC Press LLC, Wolfram Research, Inc, © 1999-2005 Wolfram Research, Inc., pp. 1-2.

\* cited by examiner

NODE IMPLEMENTATIONS

NODE 180A

| SUBJECT 182 (FIRST RELATUM) | BOND 184 (RELATION) | ATTRIBUTE 186 (SECOND RELATUM) |
|---|---|---|

EX: "GOLD" "IS" "STANDARD"

NODE 180B

| SUBJECT 182 (FIRST RELATUM) | BOND 184 (RELATION) | ATTRIBUTE 186 (SECOND RELATUM) | SEQUENCE 188 (SOURCE) |
|---|---|---|---|

EX: "ACTION" "REGARDING" "INFLATION" "WWW.WMHODGES/ HOME.ATT.NET/ INFLATION.HTM"

FIG. 5

EXY - STEP 3: RANKXY REPORT

FILE    OPTIONS    HELP

RANKXY REPORT:

TOTAL SITE COUNT = 71 FOR GOLD INFLATION >>>

| RANK | CONTRIBUTING SITE | USE COUNT |
|---|---|---|
| 1 | http://www.abeland.org/inflation.htm | 9572 |
| 2 | http://www.wmhodges/home.att.net/inflation.htm | 7629 |
| 3 | http://www.goldcopd.com | 5084 |
| 4 | http://en.wikipedia.org/wiki/inflation | 4925 |
| 5 | http://airnow.gov/ | 2888 |
| 6 | http://en.wikipedia.org/wiki/terrorism | 2567 |
| 7 | http://www.darksky.org/ | 2061 |
| 8 | http://cfrterrorism.org/home/ | 1515 |
| 9 | http://oregonstate.edu/depot/pol_sci/fac/sahr.htm | 1514 |
| 10 | http://www.terror.gen.tr/english/ | 1471 |
| 11 | http://en.wikipedia.org/wiki/pollution | 899 |
| 12 | http://www.lifesci.sussex.ac.uk/home/john_gribbin/cosmo.htm | 847 |
| 13 | http://www.gold-eagle.com/ | 811 |
| 14 | http://www.umich.edu/~ge265/society/waterpolution.htm | 631 |
| 15 | http://www.state.gov/s/ct | 336 |
| 16 | http://en.wikipedia.org/wiki/gold | 275 |
| 17 | http://www.bankofcanada.ca/en/rates/inflation_calc.html | 220 |
| 18 | http://www.mipt.org | 177 |
| 19 | http://www.worldbank.org/nipr | 140 |

FIG. 7

METHOD FOR RANKING RESOURCES USING NODE POOL

CROSS REFERENCE TO RELATED APPLICATIONS

This application is a continuation of Ser. No. 11/426,932 filed Jun. 27, 2006 now U.S. Pat. No. 8,140,559, which is a continuation-in-part of and claims priority to U.S. Ser. No. 11/273,568, filed Nov. 14, 2005, now U.S. Pat. No. 8,108,389 issued Jan. 31, 2012, and U.S. Ser. No. 11/314,835, filed Dec. 21, 2005, now U.S. Pat. No. 8,126,890 issued Feb. 28, 2012, and U.S. Ser. No. 60/694,331, filed Jun. 27, 2005, all of which are hereby incorporated herein in their entireties by reference.

BACKGROUND OF THE INVENTION

1. Field of the Invention

The invention is related to information technology and, more particularly, to a search engine that utilizes the results of knowledge correlation to identify network and/or Internet resources significant to any given user question, subject, or topic of a digital information object.

2. Description of the Related Art

Search engines are widely acknowledged to be part of the Information Retrieval (IR) domain of knowledge. IR methods are directed to locating resources (typically documents) that are relevant to a question called a query. That query can take forms ranging from a single search term to a complex sentence composed in a natural language such as English. The collection of potential resources that are searched is called a corpus (body), and different techniques have been developed to search each type of corpus. For example, techniques used to search the set of articles contained in a digitized encyclopedia differ from the techniques used by a web search engine. Regardless of the techniques utilized, the core issue in IR is relevance—that is, the relevance of the documents retrieved to the original query. Formal metrics are applied to compare the effectiveness of the various IR methods. Common IR effectiveness metrics include precision, which is the proportion of relevant documents retrieved to all retrieved documents; recall, which is the proportion of relevant documents retrieved to all relevant documents in the corpus; and fall-out, which is the proportion of irrelevant documents retrieved to all irrelevant documents in the corpus. Post retrieval, documents deemed relevant are (in most IR systems) assigned a relevance rank, again using a variety of techniques, and results are returned. Although most commonly the query is submitted by—and the results returned to—a human being called a user, the user can be another software process.

Text retrieval is a type of IR that is typically concerned with locating relevant documents which are composed of text, and document retrieval is concerned with locating specific fragments of text documents, particularly those documents composed of unstructured (or "free") text.

The related knowledge domain of data retrieval differs from IR in that data retrieval is concerned with rapid, accurate retrieval of specific data items, such as records from a SQL database.

Information extraction (IE) is another type of IR which has the purpose of automatic extraction of information from unstructured (usually text) documents into data structures such as a template of name/value pairs. From such templates, the information can subsequently correctly update or be inserted into a relational database.

Search engines that have been described in the literature or released as software products use a number of forms of input, ranging from individual keywords, to phrases, sentences, paragraphs, concepts and data objects. Although the meanings of keyword, sentence, and paragraph conform to the common understanding of the terms, the meanings of phrase, concept, and data object varies by implementation. Sometimes, the word phrase is defined using its traditional meaning in grammar. In this use, types of phrases include Prepositional Phrases (PP), Noun Phrases (NP), Verb Phrases (VP), Adjective Phrases, and Adverbial Phrases. For other implementations, the word phrase may be defined as any proper name (for example "New York City"). Most definitions require that a phrase contain multiple words, although at least one definition permits even a single word to be considered a phrase. Some search engine implementations utilize a lexicon (a pre-canned list) of phrases. The WordNet Lexical Database is a common source of phrases.

When used in conjunction with search engines, the word concept generally refers to one of two constructs. The first construct is concept as a cluster of related words, similar to a thesaurus, associated with a keyword. In a number of implementations, this cluster is made available to a user—via a Graphic User Interface (GUI) for correction and customization. The user can tailor the cluster of words until the resulting concept is most representative of the user's understanding and intent. The second construct is concept as a localized semantic net of related words around a keyword. Here, a local or public ontology and taxonomy is consulted to create a semantic net around the keyword. Some implementations of concept include images and other non-text elements.

Topics in general practice need to be identified or "detected" from a applying a specific set of operations against a body of text. Different methodologies for identification and/or detection of topics have been described in the literature. Use of a topic as input to a search engine therefore usually means that a body of text is input, and a required topic identification or topic detection function is invoked. Depending upon the format and length of the resulting topic, an appropriate relevancy function can then be invoked by the search engine.

Data objects as input to a search engine can take forms including a varying length set of free form sentences, to full-length text documents, to meta-data documents such as XML documents. The Object Oriented (OO) paradigm dictates that OO systems accept objects as inputs. Some software function is almost always required to process the input object so that the subsequent relevance function of the search engine can proceed.

Ranked result sets have been the key to marketplace success for search engines. The current dominance of the Google search engine (a product of Google, Inc.) is due to far more to the PageRank system used in Google that lets (essentially) the popularity of a given document dictate result rank. Popularity in the Google example applies to the number of links and to the preferences of Google users who input any given search term or phrase. These rankings permit Google to optimize searches by returning only those documents with ranks above a certain threshold (called k). Other methods used by web search engines to rank results include "Hubs & Authorities" which counts links into and out of a given web page or document, Markov chains, and random walks.

BRIEF SUMMARY OF THE INVENTION

The present invention discloses a new and novel form of search engine which utilizes a computer implemented method to identify at least one resource, referenced by that resource's unique URI (Uniform Resource Identifier) or referenced by that resource's URL (Uniform Resource Locator), such resource being significant to any given user question, subject, or topic of a digital information object. For the present invention, the user question or subject or topic acts as input. The input is utilized by a software function which attempts to construct or discover logical structures within a collection of data objects, each data object being associated with the resource that contributed the data object, and the constructed or discovered logical structures being strongly associated with the input. For a preferred embodiment, that software function is a knowledge correlation function as described in said Ser. No. 11/273,568 and the logical structure is a form of directed acyclic graph termed a quiver of paths. If such logical structures strongly associated with the input are in fact constructed or discovered, the data object members of such logical structures become an answer space. Using the answer space, another software function is then able to determine with a high degree of confidence which of the resources that contributed to the answer space are the most significant contributors to the answer space, and thereby identify URLs and URIs most significant to the input question, subject or topic. Finally, a software function is used to rank in significance to the input each of the URL and URI referenced resources that contributed data objects to the answer space.

The present invention differs from existing search engines because the Knowledge Correlation process as described in said Ser. No. 11/273,568, which is used in this invention, attempts to construct an exhaustive collection of paths describing all connections—called correlations—between one term, phrase, or concept referred to as X (or "origin") and a minimum of a second term, phrase or concept referred to as Y (or "destination"). If one or more such correlations can in fact be constructed, the present invention identifies as relevant all resources which contributed to constructing the correlation(s). Unlike existing search engines, relevancy in the present invention applies not to individual team, phrases or concepts in isolation but instead to the answer space of correlations that includes not only the X and the Y, but to all the terms, phrases and concepts encountered in constructing the correlations. Because of these novel characteristics, the present invention is uniquely capable of satisfying user queries for which cannot be answered using the content of a single web page or document.

Input to the present invention differs from current uses because all input modes of the present invention must present a minimum of two (2) non-identical terms, phrases, or concepts. "Non-identical" in this usage means lexical or semantic overlap or disjunction is required. As described in said Ser. No. 11/273,568, the minimum two terms, phrases, or concepts are referred to as X and Y (or "origin" and "destination"). No input process can result in synonymy, identity, or idempotent X and Y term, phrases or concepts. As with existing art, text objects and data objects can be accepted (in the present invention, as either X or Y) and the topics and/or concepts can be extracted prior to submission to the Knowledge Correlation process. However, unlike most (if not all) existing search engines, the form of the input (term, phrase, concept, or object) is not constrained in the present invention. This is possible because the relevancy function (Knowledge Correlation) does not utilize similarity measures to establish relevancy. This characteristic will allow the present invention to be seamlessly integrated with many existing IR applications.

Regardless of the forms or methods of input, the purpose of Knowledge Correlation in the present invention is to establish document relevancy. Currently, relevancy is established in IR using three general approaches: set-theoretic models which represent documents by sets; algebraic models which represent documents as vectors or matrices; and probabilistic models which use probabilistic theorems to learn document attributes (such as topic). Each model provides a means of determining if one or more documents are similar and thereby, relevant, to a given input. For example, the most basic set-theoretic model uses the standard Boolean approach to relevancy—does an input word appear in the document? If yes, the document is relevant. If no, then the document is not relevant. Algebraic models utilize techniques such as vector space models where documents represented as vectors of terms are compared to the input query represented as a vector of terms. Similarity of the vectors implies relevancy of the documents. For probabilistic models, relevancy is determined by the compared probabilities of input and document.

As described above, the present invention establishes relevancy by an entirely different process, using an entirely different criteria than any existing search engine. However, the present invention is dependent upon Discovery and Acquisition of "relevant" sources within the corpus (especially if that corpus is the WWW). For this reason, any form of the existing art can be utilized without restriction during the Discovery phase as described in said Ser. No. 11/273,568 to assist in identifying candidate resources for input to the Knowledge Correlation process.

For all search engines, simply determining relevancy of a given document to a given input is necessary but not sufficient. After all—using the standard Boolean approach to relevancy as an example—for any query against the WWW, which contained the word "computer", tens of millions of documents would qualify as relevant. If the user was actually interested only in documents describing a specific application of "computer", such a large result set would prove unusable. As a practical matter, users require that search engines rank their results from most relevant to least relevant. Typically, users prefer to have the relevant documents presented in order of decreasing relevance—with the most relevant result first. Because most relevance functions produce real number values, a natural way to rank any search engine result set is to rank the members of the result set by their respective relevance scores.

The present invention utilizes a ranking method that is novel because it is a function of the degree to which a given document or resource contributed to the correlation "answer space". As described in said Ser. No. 11/273,568, that answer space is constructed from data structures called nodes, which in turn are created by decomposition of relevant resources. Even the most naïve ranking function of the present invention—which counts the frequency of node occurrence in the answer space—can identify documents that uniquely or strongly relevant to the original user query. More sophisticated ranking mechanisms of the current invention as described more hereinafter improve that outcome.

BRIEF DESCRIPTION OF THE DRAWINGS

FIG. 5 is a copy of FIG. 1C of Ser. No. 11/273,568.
FIG. 7 is a copy of FIG. 2E of Ser. No. 11/273,568.

DESCRIPTION OF THE INVENTION

Figure 1:
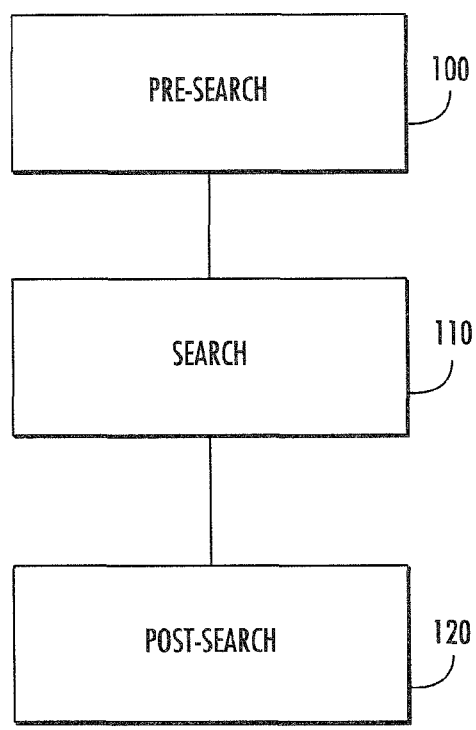
FIG. 1 is a block diagram showing functional components of a search engine in accordance with one aspect of the invention.

FIG. 1 is a block diagram of three examples of input accepted by the correlation function 110. A subject 200 is evaluated by the subject evaluation function 220. A digital information object 230 is examined for a topic by an adapter 235 of the topic detection module 240. A canonical form question generation function 250 generates a question 260 as input.

In a preferred embodiment, a minimum of two inputs in any form and from any source as described more hereinafter must be submitted to the correlation function 110. There is a first such input, called the X or "origin" input and there is a second such input, called the Y or "destination" input. Accordingly, acceptable inputs may include any combination of two subjects 200, digital information objects 230, or questions 260.

In another embodiment as described more hereinafter, a minimum of one X input which is a subject 200, digital information object 230 or question 260 is submitted to the correlation function 110. A second input, called a stop correlation condition, is passed to the correlation function 110. The actual value of the required Y which is a correlation destination remains unknown until the stop correlation function is satisfied by the correlation function 110. No actual Y input need be processed as input, but the requirement for a correlation destination is satisfied.

Figure 3:
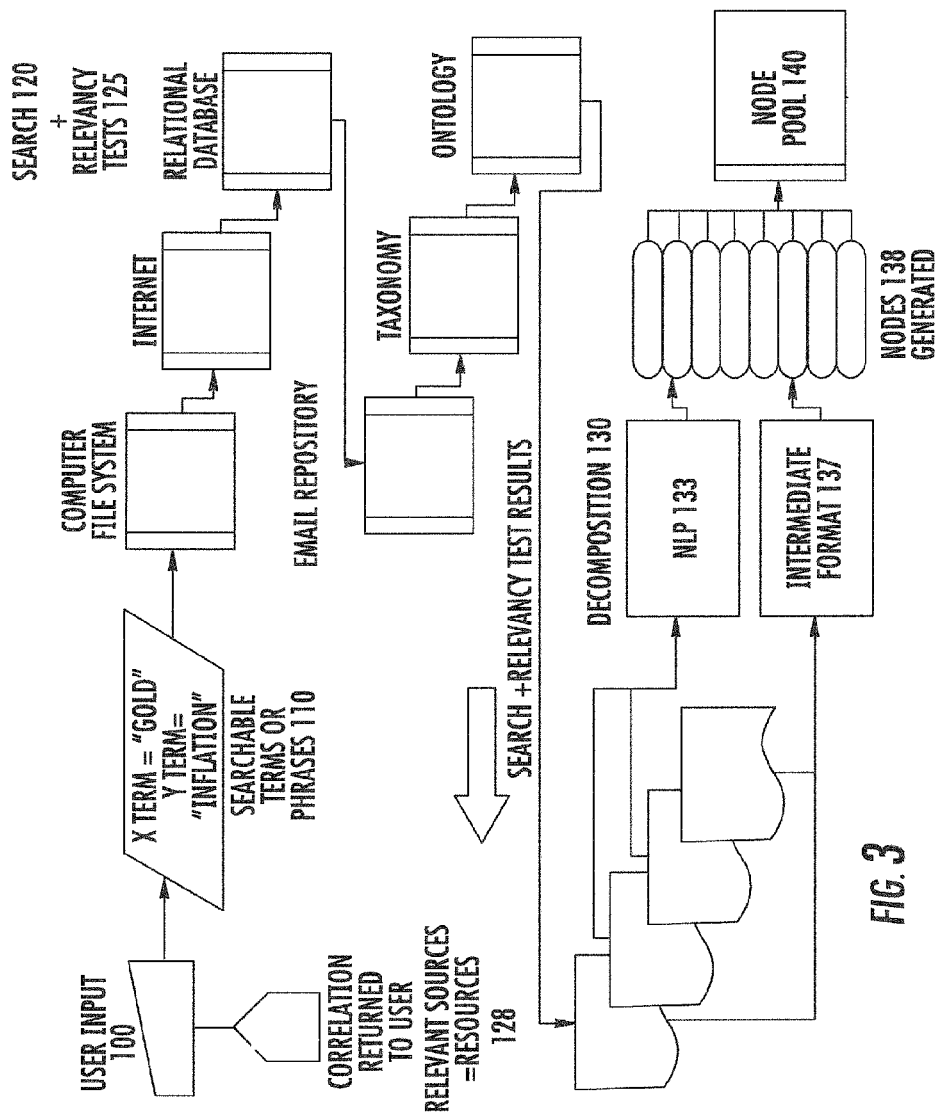
FIG. 3 is a copy of FIG. 1A of Ser. No. 11/273,568.

The first example illustrated in FIG. 1 is illustrated in greater detail in FIG. 3. In one embodiment, the subject 200 may be an individual keyword, a phrase, a sentence, or a concept. When the subject 200 is an individual keyword, the subject 200 is passed by the subject evaluation function 220 directly to the correlation function 110 without further processing. Likewise, when the subject 200 is a phrase, the subject 200 is passed by the subject evaluation function 220 directly to the correlation function 110 without further processing. When the subject 200 is a sentence, a natural language parser (NLP) 133 will be invoked to perform a syntactic analysis of the sentence to extract the actual subject 200 of the sentence in the form of words and/or phrases. Such words or phrases will then be passed to the correlation function 110. Additional words or phrases may be extracted from the sentence and submitted to the correlation function 110 as context. As described in said Ser. No. 11/273,568, any number of context words or phrases which are in addition to the X or Y words or phrases can be submitted to the correlation function 110 to improve said function. The selection of what words or phrases (if any) that are to be extracted from a sentence is based upon the membership of the word or phrase in any lexicon of the NLP 133, and the absence of the word from a common list of stop words. Stop words are well known in IR. Such words cannot be used to establish relevance in set-theoretic models of IR, so are never added to the indexes built for such models.

In the event that the sentence is a question 250 which matches a canonical form, the subject evaluation function 220 will extract from the sentence both the X and Y words or phrases and submit them to the correlation function 110. When the subject 200 is a concept, the concept word or phrase will be submitted to the correlation function 110 as either X or Y, and the remaining terms in the concept cluster or map will be submitted to the correlation function 110 as context words or phrases.

Figure 6:
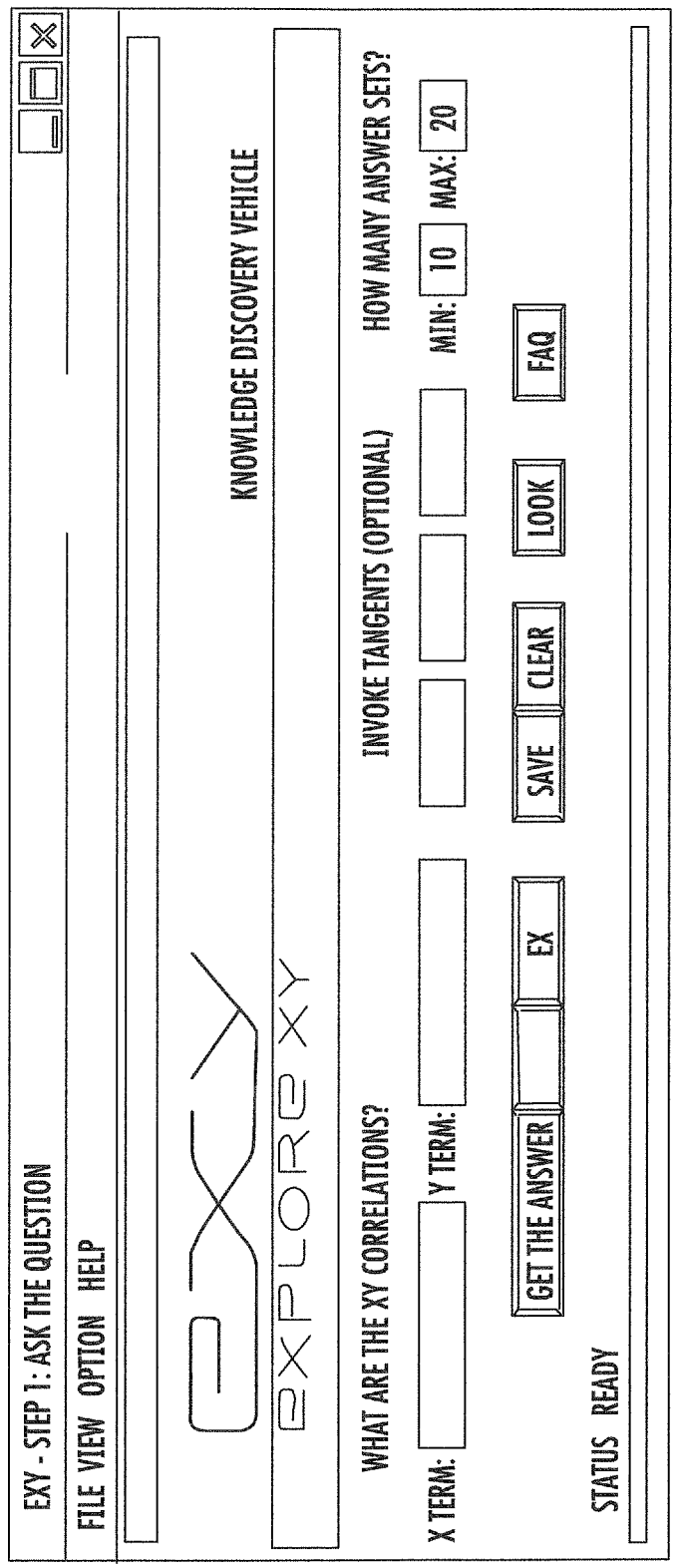
FIG. 6 is a copy of FIG. 2A of Ser. No. 11/273,568.

In a preferred embodiment, the subject will be provided by a user by means of Graphical User Interface such as FIG. 6. In other embodiments, any well known input interface will be utilized (e.g. text input field, spoken input, etc.).

In one embodiment, referring to FIG. 3, the subject 200 shall take the form of a complex subject, that is, a subject that consists of one independent clause, and one or more dependent clauses. For example, "regulation of pollution, given the effects of automobile pollution". In other embodiments, the subject 200 shall take the form of a compound subject, that is, a subject that consists of two or more independent clauses connected using logical operators such as "and" "or" "not". For example, "the Trilateral Commission and international NGOs not World Bank". Alternatively, the subject 200 shall take the form of a multi-part orthogonal subject, that is, a subject that consists of two or more independent clauses which are not connected, and which may be orthogonal with respect to each other. For example, "poaching, endangered species, men's health, government intervention". Alternatively, the subject 200 shall take the form of a multi-part orthogonal subject, that is, a subject that consists of two or more independent clauses which are not connected, and which may be orthogonal with respect to each other. For example, "poaching, endangered species, men's health, government intervention". In these embodiments, advanced NLP methods for clause recognition (see Hachey, B. C. 2002. Thesis: *Recognising Clauses Using Symbolic and Machine Learning Approaches*. University of Edinburgh) will be applied to the subject 200 to first decompose the subject 200 into clauses and from there, by means of syntactic analysis, into keywords and phrases. Clause recognition techniques will be used to discriminate between X, Y, and context inputs to the correlation function 110.

Figure 4:
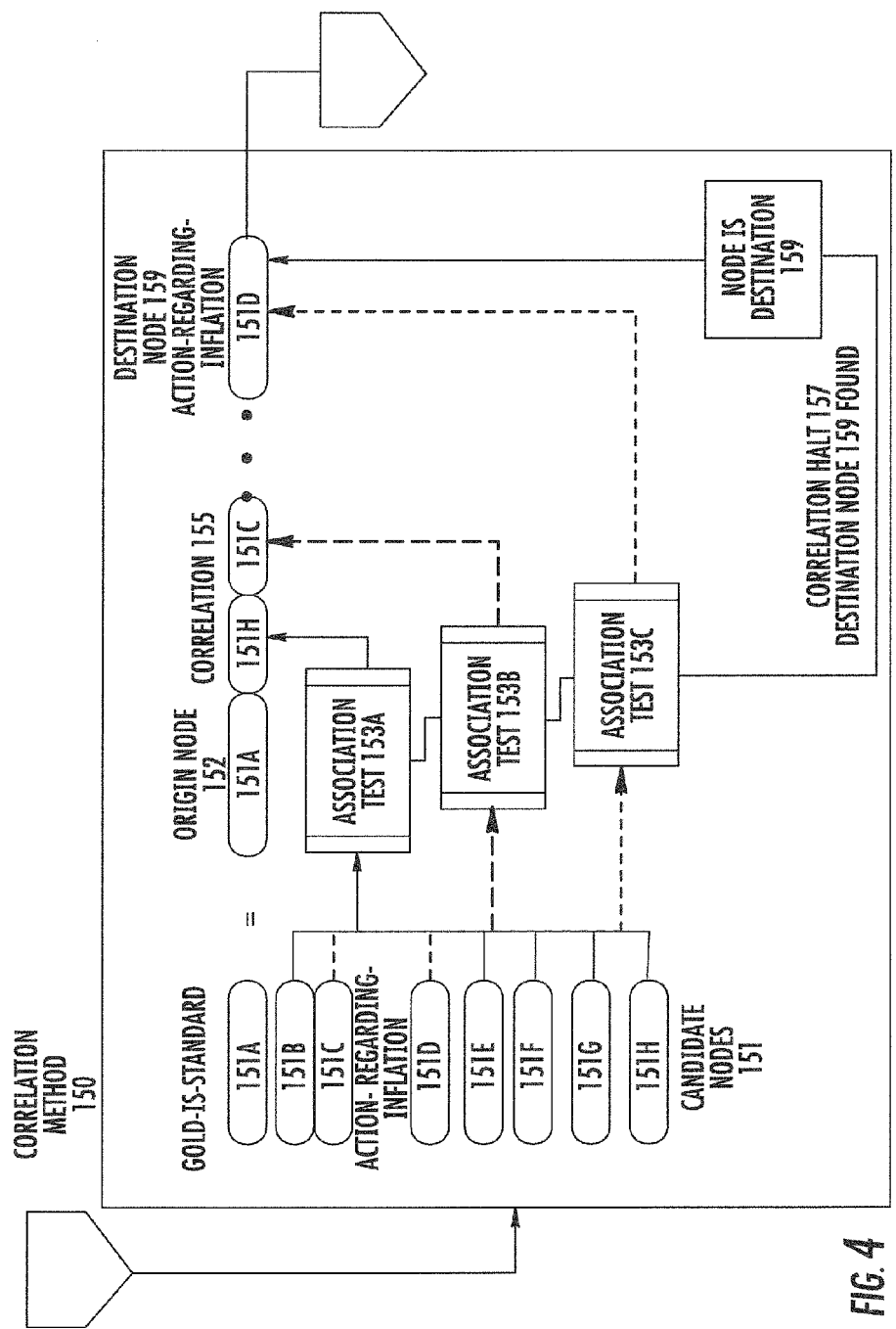
FIG. 4 is a copy of FIG. 1B of Ser. No. 11/273,568.

In one embodiment, the subject evaluation function 220 will determine if the user-provided subject 200 would produce as response from the present invention a listing as the most appropriate response. For example, referring to FIG. 4, is the user-provided subject is "Italian restaurants Dover DE", the subject evaluation function 220 will recognize that a listing of Italian restaurants in Dover, Del. is sought. In this event, the subject evaluation function 220 will either direct the user to use one of the well known simple web search engines such as Google (a product of Google, Inc.) or Yahoo (a product of Yahoo, Inc.), or will directly invoke one of those simple search engines. Alternatively, the subject evaluation function 220 will determine if the user-provided subject would produce as response a single web page as the most appropriate response. For example, is the user-provided subject is "show times rialto theatre", the subject evaluation function 220 will recognize that the web site for the Rialto Theatre is sought. In this event, the subject evaluation function 220 will either direct the user to use one of the well known simple web search engines such as Google or Yahoo, or will directly invoke the web site of Rialto Theatre, or will directly invoke one of the simple search engines named above. This is achieved by an automatic phrase recognition techniques (see Kelledy, F., Smeaton, A. F. 1997. *Automatic Phrase Recognition and Extraction from Text*. Proceedings of the 19th Annual BCS-IRSG Colloquium on IR Research) using the rule that when precisely two perfect phrases comprise the subject 220 and one of the phrases is a proper geographical name (e.g. "New York City") or a proper name ("Rialto Theatre") and one of the phrases is an adjective+ noun phrase ("show times" or "Italian restaurants"), the simple web search engine should be invoked. More sophisticated rules can easily be defined to cover most circumstances.

The third input mode illustrated in FIG. 1 is more fully illustrated in FIG. 6 wherein the input to the correlation function 110 is a user question, and the user question shall be composed of an incomplete question in canonical form and, in addition, one or more key words, wherein the key words complete the question [comparable to the well known paradigm of "fill in the blanks"]. Alternatively, the incomplete question will be explicitly selected by the user. In one embodiment, the incomplete question will be explicitly selected by the user from a list or menu of supported canonical form questions. In another, the list or menu of incomplete supported canonical form questions will be "static"—that is, the list will not vary at each invocation. Alternatively, the list or menu of incomplete supported canonical form questions will be "dynamic"—that is, the list varies at each invocation. Referring to FIG. 1, the dynamic list or menu of incomplete supported canonical form questions will be generated at each invocation by means of a software function, the canonical form question generation function 250, a software program component, written in a computer programming language (e.g. Java, a product of Sun Microsystems, Inc.). Alternatively, the incomplete question will be implicit, the question being selected by a software program component, the canonical form question generation function 250. Or, the incomplete implicit question that will be selected by the canonical form question generation function 250 will be "static"—that is, it will not vary at each invocation.

In a currently preferred embodiment, the static implicit selected question is "What are the connections between [keyword 1] and [keyword 2]?" Alternatively, the static implicit selected question is "What are the connections between [keyword 1] and [keyword 2] in the context of [keyword 3] and/or [keyword 4] and/or [keyword 5]?" Or, the incomplete implicit question that will be selected by the canonical form question generation function 250 will be "dynamic"—that is, it will vary at each invocation.

In one embodiment, the digital information object 230 will be provided by a user. The digital information object 230 will include, but not be limited to the forms:

(i) text (plain text) files.
(ii) Rich Text Format (RTF) (a standard developed by Microsoft, Inc.). An alternative method is to first obtain clean text from RTF by the intermediate use of a RTF-to-text conversion utility (e.g. RTF-Parser-1.09, a product of Pete Sergeant).
(iii) Extended Markup Language (XML) (a project of the World Wide Web Consortium) files.
(iv) any dialect of markup language files, including, but not limited to: HyperText Markup Language (HTML) and Extensible HyperText Markup Language (XHTML™) (projects of the World Wide Web Consortium), RuleML (a project of the RuleML Initiative), Standard Generalized Markup Language (SGML) (an international standard), and Extensible Stylesheet Language (XSL) (a project of the World Wide Web Consortium).
(v) Portable Document Format (PDF) (a proprietary format of Adobe, Inc.) files (by means of the intermediate use of a PDF-to-text conversion utility).
(vi) MS WORD files e.g. DOC files used to store documents by MS WORD (a word processing software product of Microsoft, Inc.) This embodiment programmatically utilizes a MS Word-to-text parser (e.g. the Apache POI project, a product of Apache.org). The POI project API also permits programmatically invoked text extraction from Microsoft Excel spreadsheet files (XLS). An MS Word file can also be processed by a NLP as a plain text file containing special characters, although XLS files cannot.
(vii) event-information capture log files, including, but not limited to: transaction logs, telephone call records, employee timesheets, and computer system event logs.
(viii) web pages
(ix) blog pages
(x) a relational database row.
(xi) a relational database view.
(xii) a relational database table.
(xiii) a relational database answer set (i.e. the set of rows resulting from a relational algebra operation).

The topic of the digital information object 230 will be determined by a software function, the topic detection function 240, a software program component. Examples of such topic detection software have been well described in the literature (see Chen, K. 1995. *Topic Identification in Discourse*. Morgan Kaufman). The topic detection function 240 will be implemented with software adapters 235 that handle each form of digital information object 230. Such software adapters 235 are well known (for an example, see http://www-306.ibm.com/software/integration/wbiadapters/framework). The output of the topic detection function will be keywords and/or phrases which will then be submitted to the correlation function 110.

Figure 8:
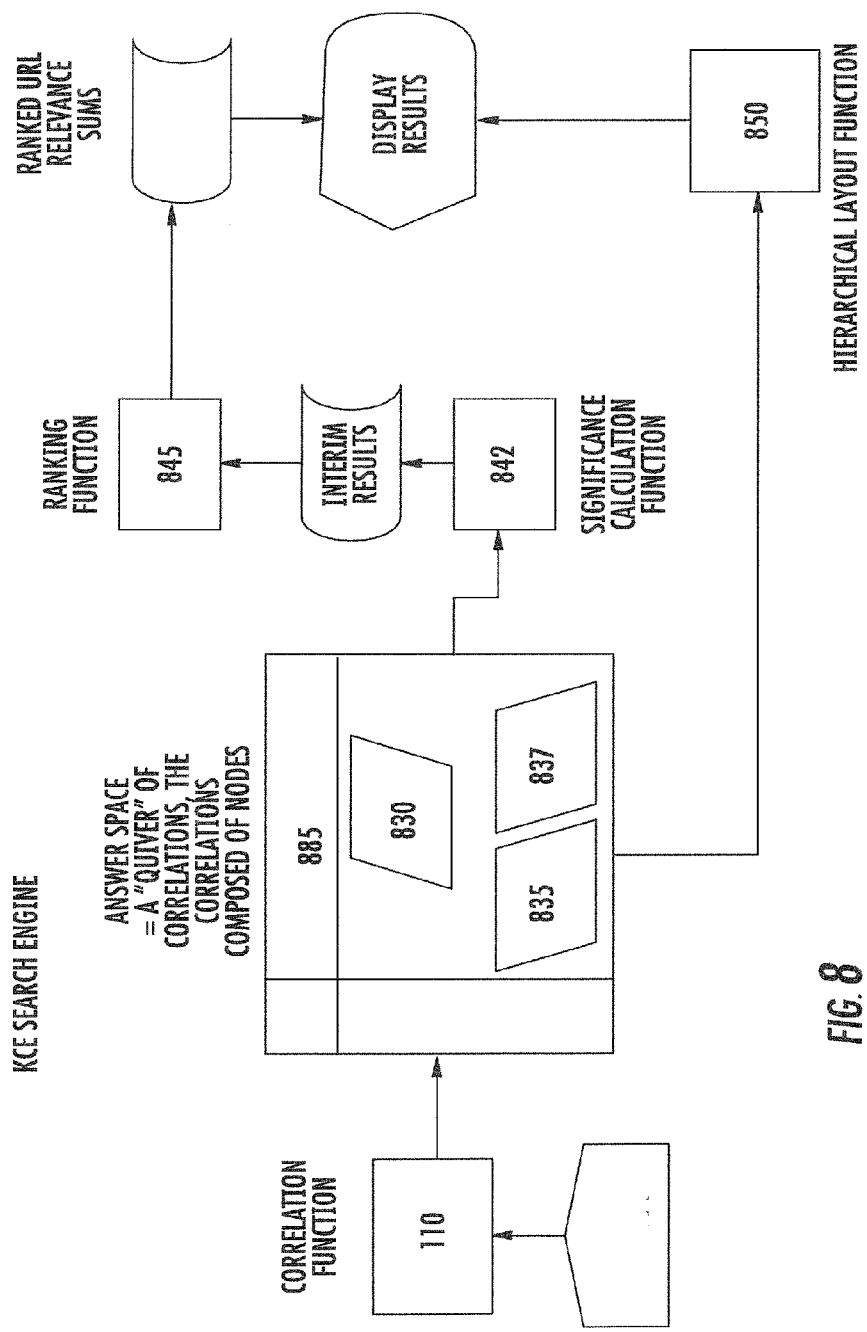
FIG. 8 is a block diagram of the post search block 120 of FIG. 1.

FIG. 8 is a flow chart of the search engine process initiated by the knowledge correlation function 110 upon inputs as described in FIG. 1, and continuing through to presentation of results to a user in accordance with one aspect of the invention. The correlation function 110 places relevant data structure objects 830, triples 835 and associated objects 837 into an answer space 885. The significance of the objects in the answer space 885 is determined by a significance calculation function 840 which sets up data for the ranking function 845 to rank by significance. Output is then displayed to the user. In the event the correlation function creates any kind of directed acyclic graph, the graph can be displayed to the user after being organized for layout by the hierarchical layout function 850.

The present invention is dependent upon the success of the correlation function 110 disclosed in patent application Ser. No. 11/273,568, which summarizes the correlation function 110 used in the present invention.

Computers that may be searched in this way include individual personal computers, individual computers on a network, network server computers, network ontology server computers, network taxonomy server computers, network database server computers, network email server computers, network file server computers. Network ontology servers are special typically high performance computers which are dedicated to the task of supporting semantic search functions for a large group of users. Network taxonomy servers are special typically high performance computers which are dedicated to the task of supporting taxonomic search functions for a large group of users. Network database servers are special typically high performance computers which are dedicated to the task of supporting database functions for a large group of users. Network email servers are special typically high performance computers which are dedicated to the task of supporting email functions for a large group of users. Network file servers are special typically high performance computers which are dedicated to the task of supporting file persistence and retrieval functions for a large group of users. The computer network has a minimum of two network nodes and the maximum number of network nodes is infinity. The computer file system has a minimum of two files and the maximum number of files is infinity.

Upon successful completion of the correlation function 110, an answer space 800 will exist. As described in said Ser. No. 11/273,568, and illustrated in FIG. 8 of this application, the answer space 800 is composed of correlations (Ser. No. 11/278,568 Item 155). The correlations (Ser. No. 11/278,568 Item 155) are in turn composed of nodes FIG. 5 (Ser. No. 11/278,568 Items 180A and 180B). The successful correlations FIG. 4 (Ser. No. 11/278,568 Item 155) produced by the correlation function 110 are together modeled as a directed graph (also called a digraph) of correlations in one preferred embodiment. Alternatively, the successful correlations FIG. 4 (Ser. No. 11/278,568 Item 155) produced by the correlation function 110 are together modeled as a quiver of paths of successful correlations. Successful correlations FIG. 4 (Ser. No. 11/278,568 Item 155) produced by the correlation function 110 are together called, with respect to correlation, the answer space 800. Where the correlation function 110 constructs a quiver of paths where each path in the quiver of paths is a successful correlation, all successful correlations share as a starting point the origin node (Ser. No. 11/278,568 Item 152), and all possible correlations (Ser. No. 11/278,568 Item 155) from the origin node (Ser. No. 11/278,568 Item 152) are constructed. All correlations (Ser. No. 11/278,568 Item 155) (paths) that start from the same origin term-node (Ser. No. 11/278,568 Item 152) and terminate with the same target term-node (Ser. No. 11/278,568 Item 159) or the same set of related target term-nodes (Ser. No. 11/278,568 Item 159) comprise a correlation set.

In a currently preferred embodiment, the answer space 800 is stored in a computer digital memory, or stored on a computer digital storage media (e.g. a hard drive). Such digital memory and digital storage devices are well known. The answer space 800 transiently resides or is persisted on a computing device, a computer network-connected device, or a personal computing device. Well known computing devices include, but are not limited to super computers, mainframe computers, enterprise-class computers, servers, file servers, blade servers, web servers, departmental servers, and database servers. Well known computer network-connected devices include, but are not limited to internet gateway devices, data storage devices, home internet appliances, set-top boxes, and in-vehicle computing platforms. Well known personal computing devices include, but are not limited to, desktop personal computers, laptop personal computers, personal digital assistants (PDAs), advanced display cellular phones, advanced display pagers, and advanced display text messaging devices. The answer space 800 contains or associates a minimum of two nodes (Ser. No. 11/278,568 Items 180A and 180B) and the maximum number of nodes (Ser. No. 11/278,568 Items 180A and 180B) is infinity.

Because the nodes (Ser. No. 11/278,568 Items 180A and 180B) are the products of a decomposition function (Ser. No. 11/278,568 Item 130) applied against the resources (Ser. No. 11/278,568 Item 128) identified by the Discovery phase of the correlation function 110, the nodes (Ser. No. 11/278,568 Items 180A and 180B) are strongly associated with the resources (Ser. No. 11/278,568 Item 128) from which the nodes (Ser. No. 11/278,568 Items 180A and 180B) were derived. Such resources (Ser. No. 11/278,568 Item 128) are here called contributing resources. Further, the answer space 800 is strongly associated with a user query (manifested as input subjects 200, digital information objects 230, or questions 250) because a successful correlation (Ser. No. 11/278, 568 Item 155) is an existential proof (existential quantification) that the user query can be satisfied from the contents of corpus. The present invention is based upon the fact that the strong association of the user query to the answer space 800 is transitive to the resources (Ser. No. 11/278,568 Items 128) which contributed nodes (Ser. No. 11/278,568 Items 180A and 180B) to the answer space, thereby enabling the present invention of a knowledge correlation search engine to deliver highly accurate links of resources (Ser. No. 11/278,568 Items 128) which are relevant to the user query.

A requirement of the present invention is that the resources (Ser. No. 11/278,568 Item 128) which contributed nodes (Ser. No. 11/278,568 Items 180A and 180B) to the answer space 185 must be identified (i.e what are the contributing resources 000?). As can be seen in Ser. No. 11/278,568, Item 180B, a member of node Ser. No. 11/278,568 Item 180B is the Sequence (source) (Ser. No. 11/278,568 Item 188). The sequence (Ser. No. 11/278,568 Item 188) contains the URI of the resource (Ser. No. 11/278,568 Item 128) from which the node (Ser. No. 11/278,568 Item 180B) was derived (the contributing resource 128 for that node Ser. No. 11/278,568 Item 188). Therefore, the present invention can identify contributing resources 128 which are relevant to the user query by simply enumerating the URIs of all resources (Ser. No. 11/278,568 Item 128) found in all nodes (Ser. No. 11/278,568 Item 188) in the answer space 185.

Figure 2:
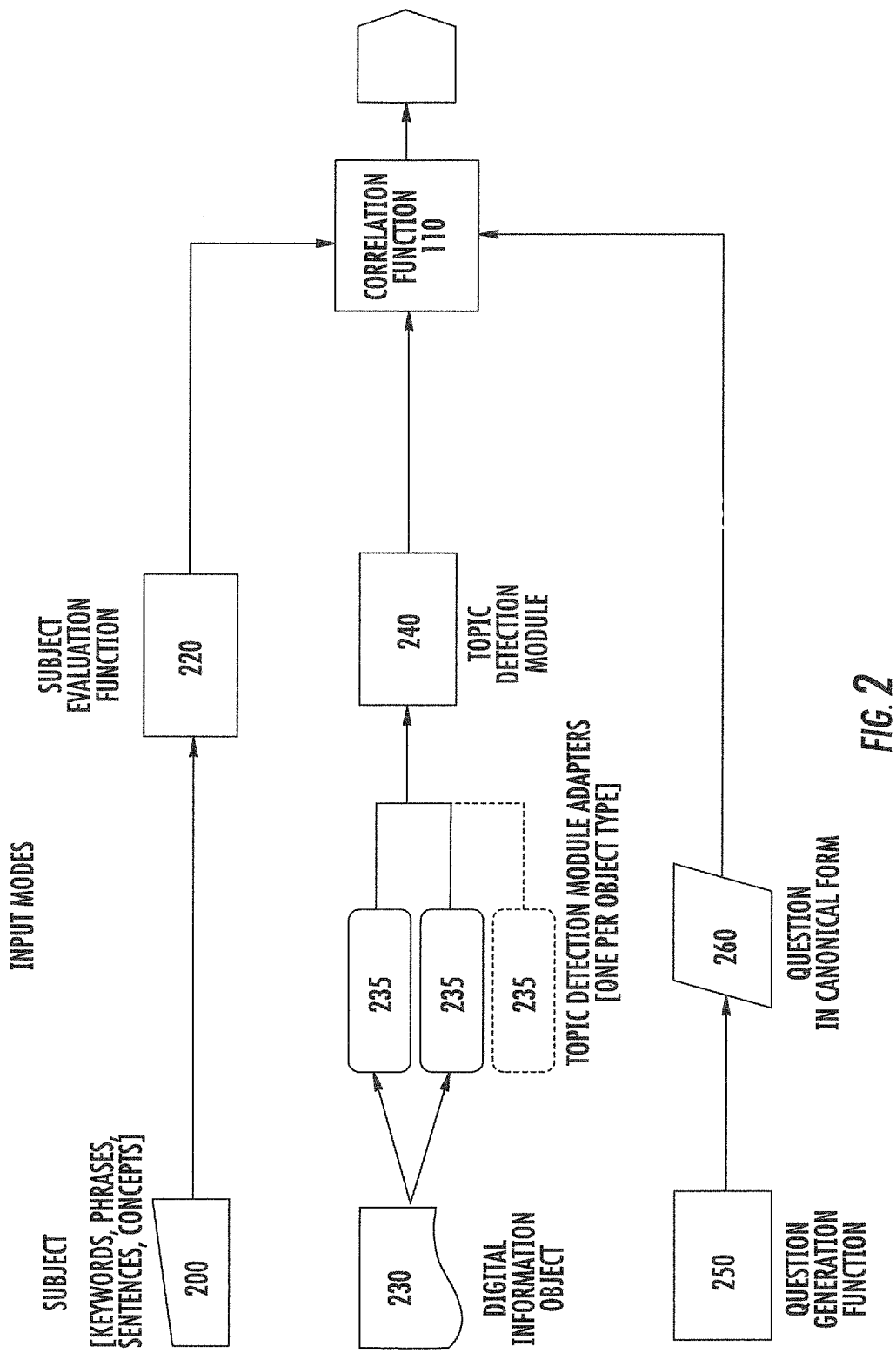
FIG. 2 is a clock diagram of the pre-search block of FIG. 1.
Figure 2A:
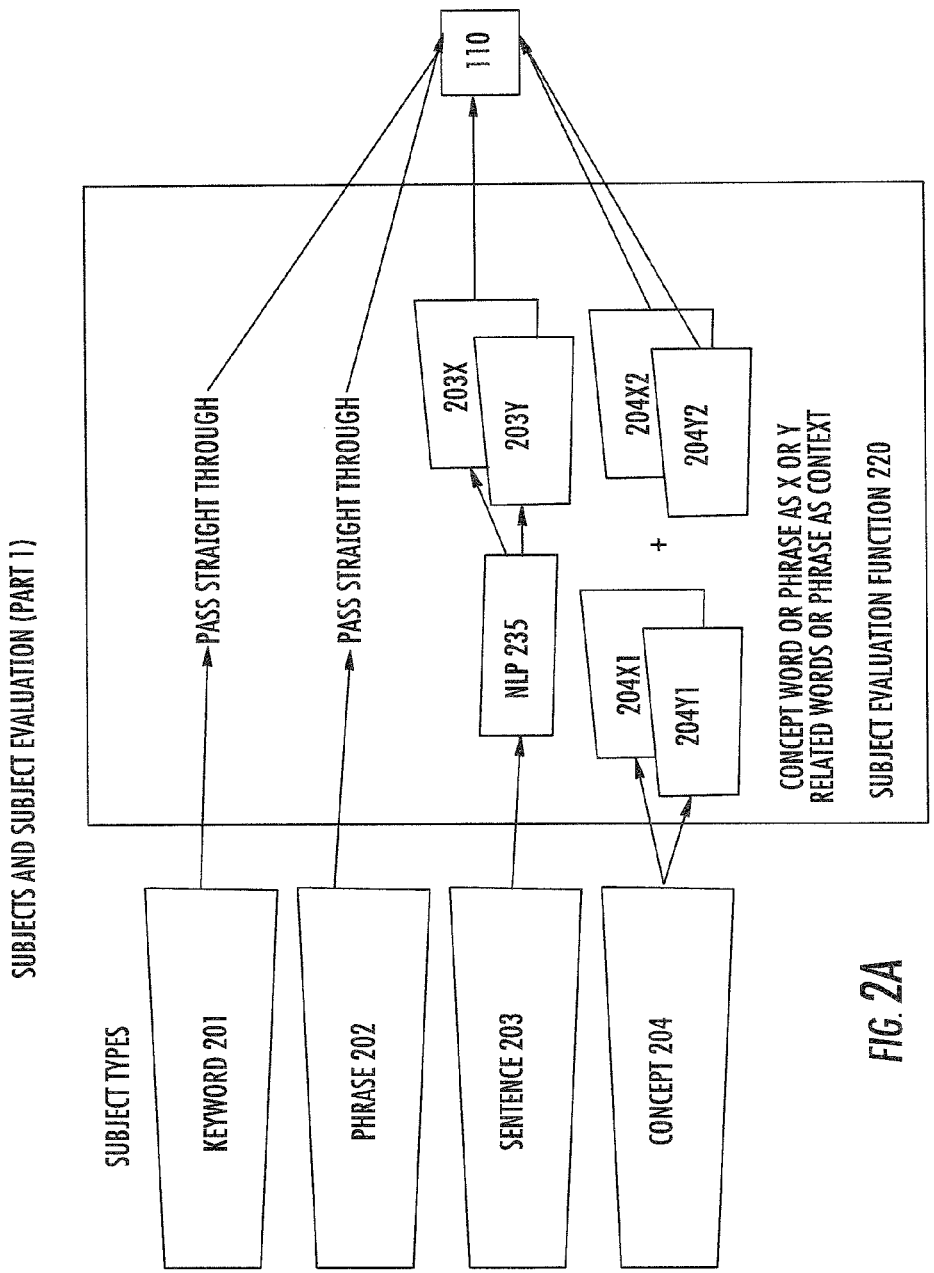
FIG. 2A is a block diagram of part of an exemplary subject evaluation function for keywords, phrases, sentences and concepts in accordance with one aspect of the invention.
Figure 2B:
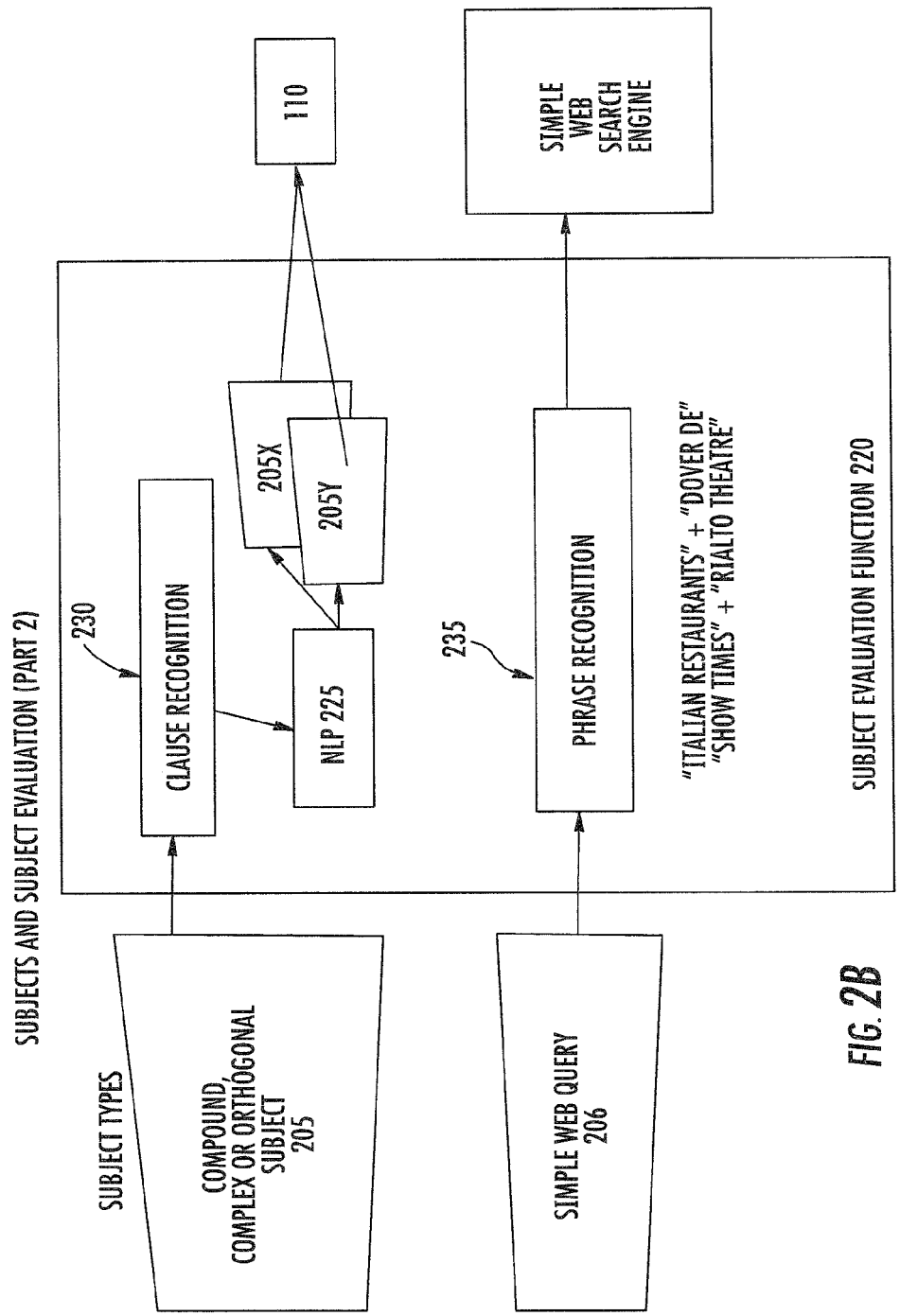
FIG. 2B is a block diagram of the remaining part of an exemplary subject evaluation function for compound, complex or orthogonal subjects and for a simple web query in accordance with one aspect of the invention.
Figure 2C:
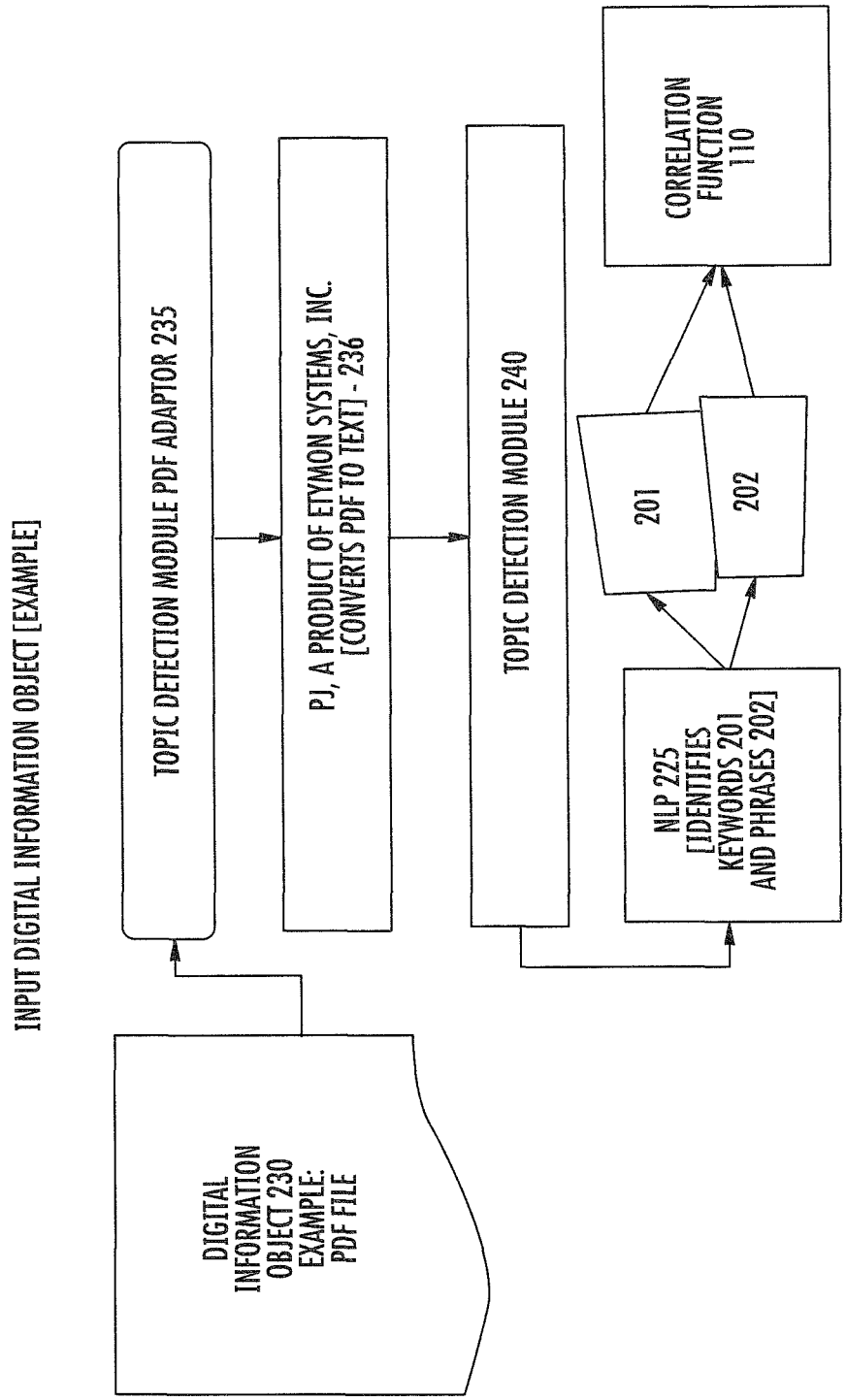
FIG. 2C is a block diagram of an exemplary topic detection module and related adapter(s) in accordance with one aspect of the invention.
Figure 2D:
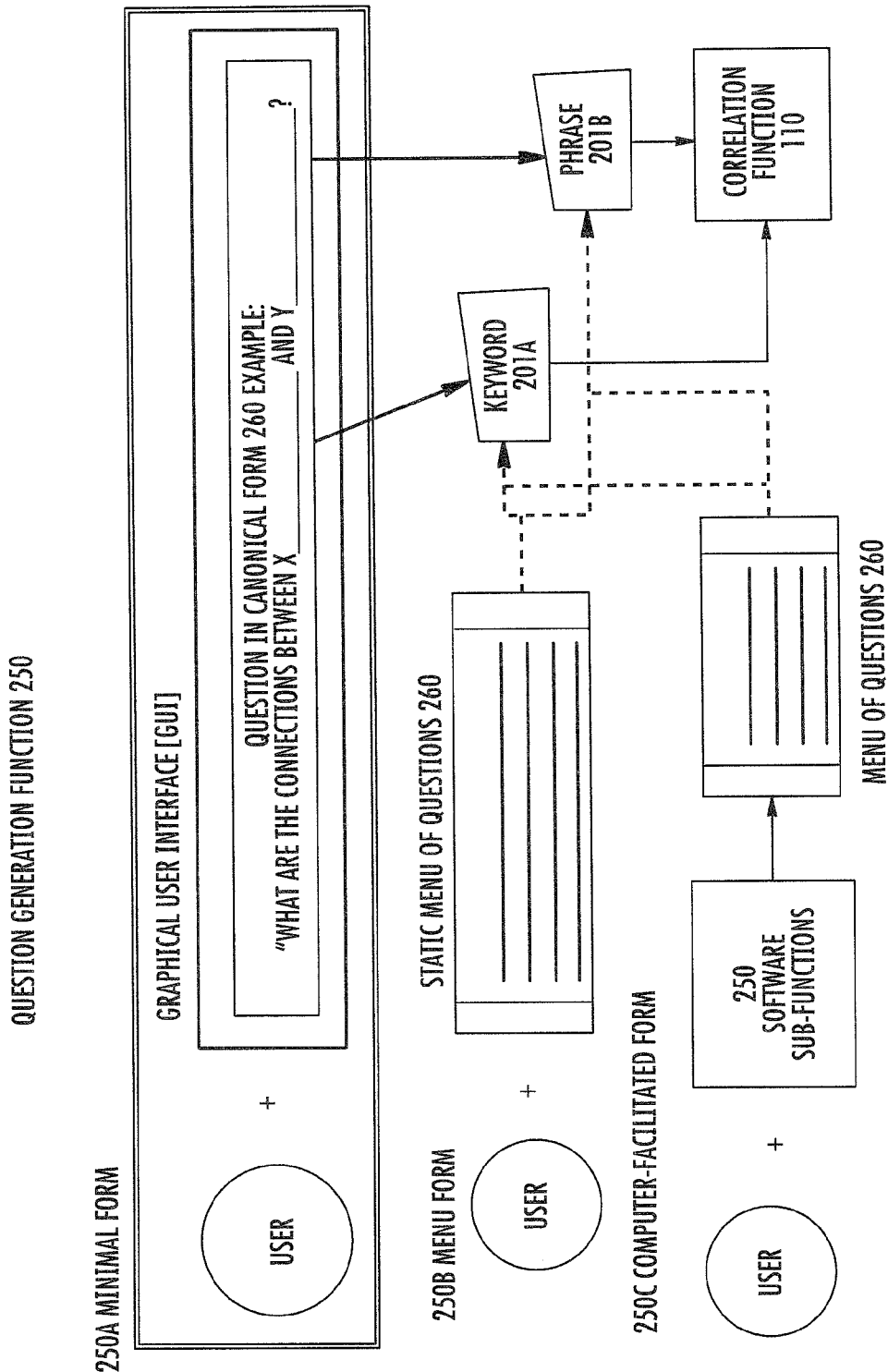
FIG. 2D is a block diagram of a question generation function in accordance with one aspect of the invention.

In an improved, but still rudimentary embodiment, each correlation (Ser. No. 11/278,568 Item 155) can be examined, and the frequency of occurrence of a contributing resource 128 in the correlation (Ser. No. 11/278,568 Item 155) can be captured in a histogram. The cumulative counts for the occurrence of all contributing resources 128 can then be sorted. The URIs for all contributing resources 000 can then be presented to the user in order of descending frequency of occurrence. For this embodiment and referring to FIG. 2, the examination of the correlations (Ser. No. 11/278,568 Item 155), capture of frequency of occurrence of contributing resources 128, and the placement of the captured frequency of occurrence of contributing resources 128 into a histogram is performed by a significance calculation function 540. The sorting of the cumulative counts for the occurrence of all contributing resources 128 is performed by a ranking function 545, and the presentation to the user of the sorted results is performed by a hierarchical layout function 550.

In another rudimentary example, the significance calculation function 842 is a statistical function that is based upon the number of unique nodes (Ser. No. 11/278,568 Item 180B) contributed to the answer space 885 by each contributing resource 128. In this embodiment, any correlations (Ser. No. 11/278,568 Item 155) in the answer space 885 are not considered. The significance calculation function 842 first lists the unique nodes (Ser. No. 11/278,568 Item 180B) in the answer space 885, with one entry in the list for each node (Ser. No. 11/278,568 Item 180B). Then, the frequency of reference to each contributing resource 128 is counted. Using standard and well-known statistical criteria and methods to measure statistical significance, the k threshold to be used by the ranking function 845 is established, and the most significant contributing resources 128 can be identified and presented to the user.

For another example, the significance calculation function 842 correlates the simple occurrence frequency to the simple contribution frequency value, resulting in a rudimentary significance score. If a scatter plot were used to display this data, the significant resources 128 with highest occurrence frequency and the highest contribution frequency would place farthest to the right and closest to the top. Again, as for all the varied embodiments of the significance calculation function 842 described more hereinafter, standard and well known statistical significance measures are utilized to provide appropriate k threshold information for the ranking function 845. Other statistical techniques that may be utilized by the significance calculation function 842—as needed—include, but are not limited to: linear (the well known Pearson r) correlation between the frequency of occurrence and simple contribution; non-linear correlations of the plot data; nonparametric statistical approaches such the Kendall coefficient of concordance, computation of the geometric mean for data which have logarithmic relation to each other, and other well known techniques to measure the relationship between the variables.

In one embodiment, a node significance score can be computed by using measures such as the ratio, frequency of occurrence over number of nodes (Ser. No. 11/278,568 Item 180B) contributed by that specific node's (Ser. No. 11/278,568 Item 180B) contributing resource 128, or the ratio, frequency of occurrence over the average number of nodes (Ser. No. 11/278,568 Item 180B) contributed by all contributing resources 128. To improve the speed of the significance calculation function 842, node significance scores can be normalized (0,1) or (−1,1), with the possibility thereby to rapidly determine if a given contributing resource 128 was significant or not significant to the answer space.

In another, the significance calculation function 842 is a link analysis function, the link analysis function 842 taking the correlation (Ser. No. 11/278,568 Item 155) as input. This exploits the differences between the correlation (Ser. No. 11/278,568 Item 155) created by the correlation function 110 compared to a web graph. The significance calculation function 842 as link analysis function establishes a link popularity score on each of node (Ser. No. 11/278,568 Item 180B) in the answer space 128. The link popularity score is determined by means of the number of in-degree links to each node (Ser. No. 11/278,568 Item 180B) in the answer space 885. The popularity score values of all nodes (Ser. No. 11/278,568 Item 180B) contributed by a contributing resource 128 are then summed. In this embodiment, the aggregate popularity scores of all nodes (Ser. No. 11/278,568 Item 180B) contributed by a contributing resource 128 are transit to the contributing resource 128 itself.

In one embodiment, the significance calculation function 842 as link analysis function establishes an importance score on each of the nodes (Ser. No. 11/278,568 Item 180B). The importance score is determined by means of the well known Kleinberg Hubs and Authorities algorithm. Hub or Authority scores for all nodes (Ser. No. 11/278,568 Item 180B) contributed by a contributing resource 128 are then summed. In this embodiment, the aggregate Hub and Authority scores of all nodes (Ser. No. 11/278,568 Item 180B) contributed by a contributing resource 128 are transit to the contributing resource 128. In an embodiment, the importance score is determined by means of the well-known 2nd version of the PageRank algorithm. PageRank scores for all nodes (Ser. No. 11/278,568 Item 180B) contributed by a contributing resource 128 are then summed. In this embodiment, the aggregate PageRank scores of all nodes (Ser. No. 11/278,568 Item 180B) contributed by a contributing resource 128 are transit to the contributing resource 128.

The results of resource significance calculation function 842 will be ranked by means of a software function, the ranking function 845, a software program component. In an embodiment, the ranking function 845 implements a simple descending sort, with the contributing resource 128 given the highest value by the significance calculation function 842 awarded the number one rank by the ranking function 845, and the ordinal rank of the other contributing resources 128 being assigned based upon their relative position in the sorted list of significance values. When the significance calculation function 842 is a statistical function that is based upon the number of discrete nodes (Ser. No. 11/278,568 Item 180B) contributed to the answer space 885 by each contributing resource 128, and when the ranking function 845 implements a simple descending sort, the ranking function is called rank by contribution. When the significance calculation function 842 is a statistical function that will calculate the sum of the relevance scores for all nodes (Ser. No. 11/278,568 Item 180B) contributed to the answer space 885 by each contributing resource 128, and when the ranking function 845 implements a simple descending sort, the ranking function is called rank by relevance. When the significance calculation function 842 is a statistical function that will calculate the sum of the popularity scores, Hub and Authority scores, or PageRank scores for all nodes (Ser. No. 11/278,568 Item 180B) contributed to the answer space 885 by each contributing resource 128, and when the ranking function 845 implements a simple descending sort, the ranking function is called rank by significance.

In a currently preferred embodiment, at least two categories of contributing resources 128 contribute nodes (Ser. No. 11/278,568 Item 180B) to the answer space 885. The two categories of contributing resources are here designated topical resources, and reference resources. Topical resources provide nodes (Ser. No. 11/278,568 Item 180B) with explicit reference to a topic, for example the triple GLOBAL WARMING-AFFECTS-GLACIERS. Reference resources provide nodes (Ser. No. 11/278,568 Item 180B) which anchor the foundations in knowledge that support topical resource nodes (Ser. No. 11/278,568 Item 180B), for example the triple GLOBAL WARMING-IS-CLIMATE CHANGE, or GLOBAL WARMING-FROM-EMISSIONS.

In an embodiment, a Support Vector Machine (SVM) is created to classify and rank contributing resources. Depending upon the characteristics and number of contributing resource 125 classifications, variations of SVM are utilized, including SVM-RFE (SVM-Recursive Feature Elimination), and R-SVM (Reduced-SVM). In a currently preferred embodiment, where the classification of contributing resources 128 into topical resources and reference resources is required, the application of SVM procedures to classify and rank the contributing resources 128 is essentially identical the SVM procedure used as a diagnostic classifier to identify healthy tissue samples from cancer tissue samples.

In a currently preferred embodiment, the correlation (Ser. No. 11/278,568 Item 155) constructed or discovered by the correlation function 110 can be displayed to a user. This display is called a presentation. In a currently preferred embodiment, the presentation of the answer space 128 will be implemented using a hierarchical layout 890. In a currently preferred embodiment, the hierarchical layout 890 will be created using a software function, the hierarchical layout function 850, a software program component. The hierarchical layout function 850 assigns the nodes of graphs on different layers in such a way that most edges in the graph flow in the same direction and the number of intersecting edges are minimized. In a currently preferred embodiment, hierarchical layout function 850 uses the Sugiyama-layout algorithm.

While various embodiments of the present invention have been illustrated herein in detail, it should be apparent that modifications and adaptations to those embodiments may occur to those skilled in the art without departing from the scope of the present invention as set forth in the following claims.

What is claimed is:

1. A computer implemented method for displaying a ranked plurality of resources based upon at least one input, the method comprising:

performing at least one input evaluation function for generating a plurality of extracted inputs from the at least one input;

decomposing a plurality of resources into a plurality of nodes;

generating an answer space by performing at least one knowledge correlation function on a node pool based upon the plurality of extracted inputs, each node of the node pool comprising a data structure including a subject, an attribute and a bond therebetween, the knowledge correlation function comprising iteratively adding nodes from the node pool onto an end of a chain of nodes by searching the node pool for a match between an attribute of a chained node and a subject of another unchained node in the node pool;

determining a plurality of most significant resources based upon the answer space;

ranking in significance the plurality of most significant resources to thereby generate the ranked plurality of resources; and displaying the ranked plurality of resources.

2. The method according to claim 1 wherein performing the at least one input evaluation function comprises performing a subject evaluation function for extracting subject information from at least one of keywords; phrases; sentences; concepts; compound, complex and orthogonal inputs; and a simple web query.

3. The method according to claim 2 wherein performing the subject evaluation function for at least one of keywords and phrases comprises performing a pass through function.

4. The method according to claim 2 wherein performing the subject evaluation function for sentences comprises performing a natural language parser function.

5. The method according to claim 2 wherein performing the subject evaluation function for concepts comprises performing an evaluation for at least one of subject, object and context information.

6. The method according to claim 2 wherein performing the subject evaluation function for at least one of compound, and complex and orthogonal inputs comprises performing a clause recognition function and a natural language parser function.

7. The method according to claim 2 wherein performing the subject evaluation function for a simple web query comprises performing a phrase recognition function.

8. The method according to claim 1 wherein the input comprises a digital information object; and wherein performing the at least one user input evaluation comprises using a topic detection module adapter and a topic detection module downstream therefrom.

9. The method according to claim 8 wherein performing the at least one user input evaluation further comprises using a natural language parser downstream from the topic detection module.

10. The method according to claim 1 further comprising performing a question generating function to obtain the at least one input for defining a query.

11. The method according to claim 1 wherein the most significant resources are transitively associated with the at least one input through resources used to create the answer space.

12. The method according to claim 1 wherein determining the plurality of most significant resources does not use a similarity measure.

13. A physical non-transitory computer-readable medium having instructions stored thereon which, when executed by a computer, cause the computer to perform an information retrieval method comprising:

performing at least one input evaluation function for generating a plurality of extracted inputs from at least one input;

decomposing a plurality of resources into a plurality of nodes;

generating an answer space by performing at least one knowledge correlation function on a node pool based upon the plurality of extracted inputs, each node of the node pool comprising a data structure including a subject, an attribute and a bond therebetween, the knowledge correlation function comprising iteratively adding nodes from the node pool onto an end of a chain of nodes by searching the node pool for a match between an attribute of a chained node and a subject of another unchained node in the node pool;

determining a plurality of most significant resources based upon the answer space;

ranking in significance the plurality of most significant resources to thereby generate the ranked plurality of resources; and displaying the ranked plurality of resources.

14. The physical non-transitory computer-readable medium according to claim 13 wherein performing the at least one input evaluation function comprises performing a subject evaluation function for extracting subject information from at least one of keywords; phrases; sentences; concepts; compound, complex or orthogonal inputs; and a simple web query.

15. The physical non-transitory computer-readable medium according to claim 14 wherein performing the subject evaluation function for at least one of keywords and phrases comprises performing a pass through function.

16. The physical non-transitory computer-readable medium according to claim 14 wherein performing the subject evaluation function for sentences comprises performing a natural language parser function.

17. The physical non-transitory computer-readable medium according to claim 14 wherein performing the subject evaluation function for concepts comprises performing an evaluation for at least one of subject, object and context information.

18. The physical non-transitory computer-readable medium according to claim 14 wherein performing the subject evaluation function for at least one of compound, complex and orthogonal inputs comprises performing a clause recognition function and a natural language parser function.

19. The physical non-transitory computer-readable medium according to claim 14 wherein performing the subject evaluation function for a simple web query comprises performing a phrase recognition function.

20. The physical non-transitory computer-readable medium according to claim 13 further comprising performing a question generating function to obtain the at least one input for defining a query.

* * * * *